United States Patent [19]

Toda

[11] 4,248,479
[45] Feb. 3, 1981

[54] RECLINING SEAT FOR VEHICLE

[75] Inventor: Eiji Toda, Hirakata, Japan

[73] Assignee: Kabushiki Kaisha Komatsu Seisakusho, Tokyo, Japan

[21] Appl. No.: 50,617

[22] Filed: Jun. 21, 1979

[30] Foreign Application Priority Data

Jun. 22, 1978 [JP] Japan .............................. 53-84819[U]

[51] Int. Cl.³ ............................................. A47C 1/024
[52] U.S. Cl. .................................. 297/378; 297/342; 297/355
[58] Field of Search ............... 297/342, 340, 341, 378, 297/355

[56] References Cited

U.S. PATENT DOCUMENTS

| | | | |
|---|---|---|---|
| 602,793 | 4/1898 | Roby | 297/342 |
| 1,822,427 | 9/1931 | Wenn et al | 297/342 |
| 3,424,492 | 1/1969 | Tabor | 297/361 |
| 3,427,072 | 2/1969 | Hale | 297/342 |
| 3,968,993 | 7/1976 | Doyle | 297/378 |

FOREIGN PATENT DOCUMENTS 471063  5/1952  Italy ........................................ 297/378

*Primary Examiner*—Francis K. Zugel
*Attorney, Agent, or Firm*—Armstrong, Nikaido, Marmelstein & Kubovcik

[57] ABSTRACT

A reclining seat for a vehicle comprising a pair of rails fixedly secured to a vehicle frame, a seat-cushion slidably mounted on the rails, a seat-back mounted for inclination on the seat-cushion, a bracket fixedly secured to the vehicle frame, a first link pivotally mounted on the bracket at one end thereof, a second link fixedly secured to a frame of the seat-cushion at one end thereof and connected to the first link at the other end, a rod pivotally mounted on the other end of the first link at the lower end thereof, and a stop fixedly secured to the frame of the seat-back, the stop being adapted to collide with the upper end of the rod when the seat-back is rearwardly inclined to a maximum whereby the maximum inclination angle of the seat-back is automatically adjusted by changing the position of the seat-cushion.

3 Claims, 4 Drawing Figures ated with the seat-cushion 3 in the longitudinal direction, a link mechanism comprising the oscillating link 9, and link 13, etc., is actuated. As a result, the rod 17 is moved in the longitudinal direction relative to the stop 19 which is fixedly secured to the seat-back 6 and also the position of the stop 19 is moved relative to the rod 17.

RECLINING SEAT FOR VEHICLE

BACKGROUND OF THE INVENTION

This invention relates to a seat adjusting device, and more specifically to an apparatus for controlling the maximum inclination angle of a seat-back for use in a seat wherein the seat-back can be inclined and adjusted freely relative to a seat-cushion.

Conventional seats of the type specified or reclining seats mounted on the vehicle body so as to be moved freely in the longitudinal direction are disadvantageous in that the distance between the seat-back and the rear wall of the driver's cab will change when the seat is moved forwards and backwards so that if the maximum inclination angle of the seat-back is not adjusted correspondingly to the amount of longitudinal movement of the seat, the seat-back may strike against the rear wall and damage the window glass fitted in the rear wall.

SUMMARY OF THE INVENTION

It is therefore an object of the present invention to provide a reclining seat for a vehicle wherein the maximum inclination angle of a seat-back is automatically adjusted by changing the position of a seat-cushion.

Another object of the present invention is to provide a reclining seat for a vehicle wherein a glass wall behind the seat can be protected from damage by automatically adjusting the maximum inclination angle of a seat-back in response to the position of a seat-cushion.

The present invention is directed to a seat-back angular position adjusting means for a reclining seat.

A reclining seat to which the present invention is applicable may comprise a pair of rails fixedly secured to a vehicle frame, a seat-cushion slidably mounted on said pair of rails, a pair of first side plates fixedly secured to both sides of said seat-cushion, a pair of second side plates each pivotally mounted on said respective first side plates, a seat-back fixedly secured to said second side plates and adapted to be inclined relative to said seat-cushion, and locking means fixedly mounted on one of said first side plates for locking said seat-back in a preselected inclined position.

A seat-back angular position adjusting apparatus according to the present invention comprises bracket means fixedly secured to said vehicle frame under said seat-cushion, a first link pivotally mounted on said bracket means at one end thereof, a second link fixedly secured to a frame of said seat-cushion at one end thereof and connected to said first link at the other end, rod means pivotally mounted on the other end of said first link means at the lower end thereof, and a stop fixedly secured to a frame of said seat-back, said stop being adapted to collide with the upper end of said rod means when said seat-back is rearwardly inclined to a maximum whereby the maximum inclination angle of said seat-back is automatically adjusted by changing the position of said seat-cushion.

The above and other objects, features and advantages of the present invention will be readily apparent from the following description taken in conjunction with the accompanying drawings.

DETAILED DESCRIPTION OF THE INVENTION

Figure 1:
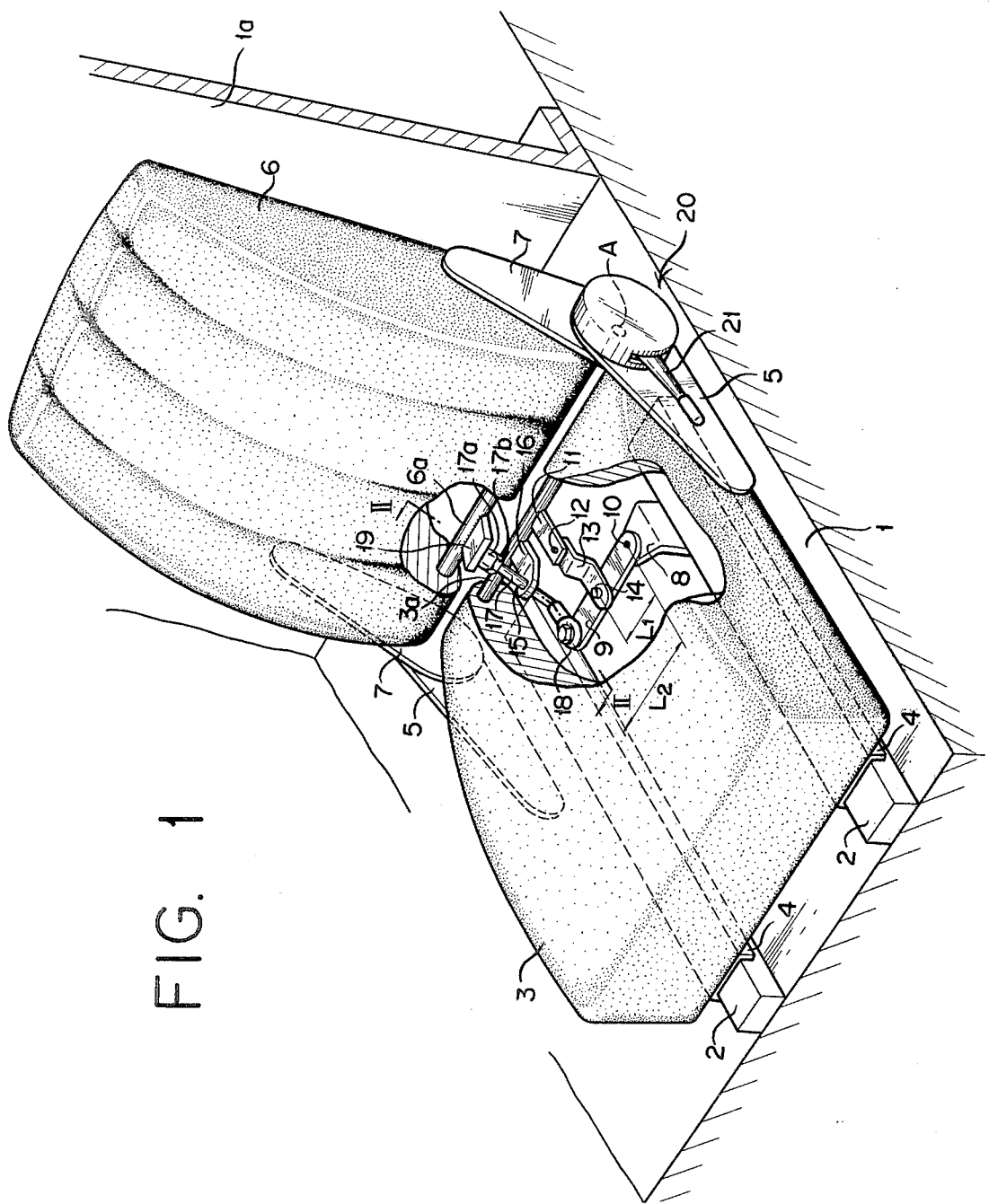
FIG. 1 is a perspective view partly broken away of a reclining seat according to the present invention.
Figure 2:
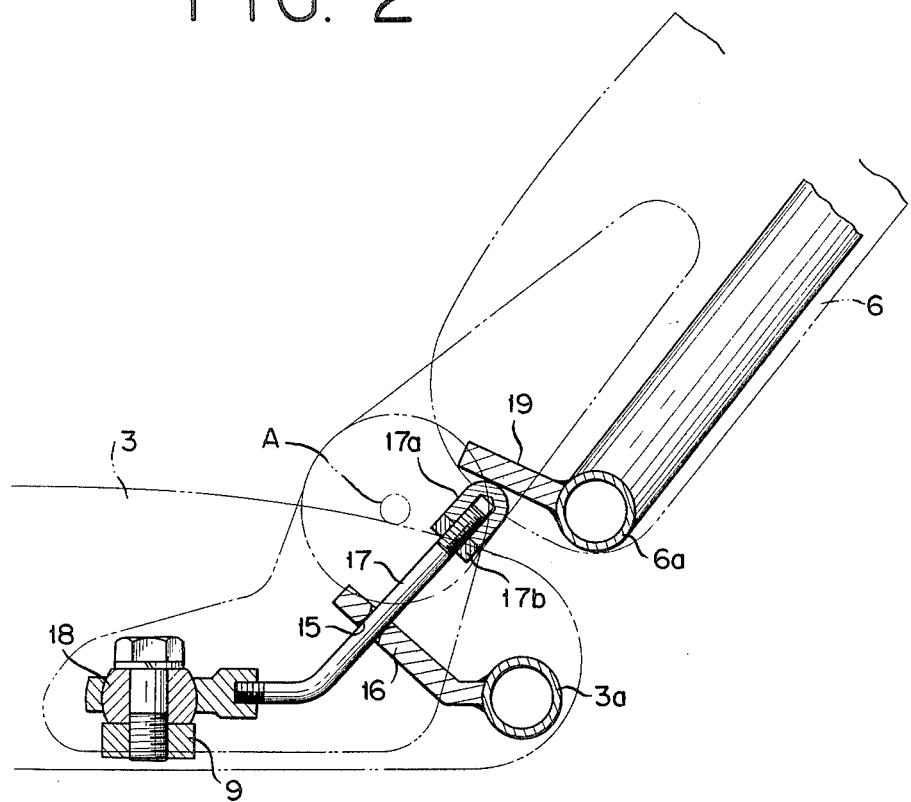
FIG. 2 is a cross-sectional view taken along the line II—II in FIG. 1.

The present invention will now be described below by way of example only with reference to the accompanying drawings.

Fixedly secured to a vehicle body 1 are a pair of rails 2, 2 extending longitudinally in parallel relationship. Slidably mounted on the rails 2, 2 are a pair of guides 4, 4 which are fixedly secured to the lower surface of a seat-cushion 3, and so the seat-cushion 3 can be moved freely along the rails 2, 2 in the longitudinal direction.

Fixedly secured to the rear parts of the seat-cushion 3 on both sides thereof are a pair of rearwardly extending stationary mounting brackets 5, 5. A pair of movable mounting brackets 7, 7 are attached to the pair of stationary brackets 5, 5 so as to be inclined freely. The pair of movable mounting brackets 7, 7 are fixedly secured to the lower portions of a seat-back 6 on both sides thereof. The seat-back 6 is of a well-known reclining seat which is adapted to be fixed at any desired inclined or angular positions by means of inclining and locking means 20 which is attached to the bracket 5. By pulling a handle 21 of the inclining and locking means 20, the seat-back 6 can be unlocked and inclined freely as desired.

Fixedly secured to the vehicle body 1 between the pair of rails 2, 2 is a mounting bracket 8 to which a leading end of an oscillating link 9 is pivotally connected by means of a pin 10. Pivotally connected to the central part of the oscillating link 9 by means of a pin 12 is a link 13 which is pivotally connected to a plate 11 by means of a pin 12. The plate 11 is fixedly secured to a frame 3a of the seat-cushion 3.

Fixedly secured to the frame 3a is a forwardly extending guide 16 having a guide hole 15 formed therein. A rod 17 is slidably fitted in the guide hole 15. The lower end of the rod 17 is pivotally connected through a ball joint 18 to the leading end of the aforementioned oscillating link 9. The upper end of the rod 17 extends obliquely and rearwardly and has nuts 17a and 17b threadably engaged therewith. The nut 17a is located opposite to a stop 19 fixedly secured to a frame 6a of the seat-back 6. The nuts 17a and 17b form a double-nut and is fixed to the rod 17 after the maximum inclination angle of the seat-back 6 has been finely adjusted.

The centre "A" of inclination of the seat-back 6 is located forwardly of the stop 19 so that when the seat-back 6 is inclined the stop 19 is allowed to abut against the rod 17 so as to limit the maximum inclination angle of the seat-back 6.

The operation of the present invention will now be described below.

Figure 3:
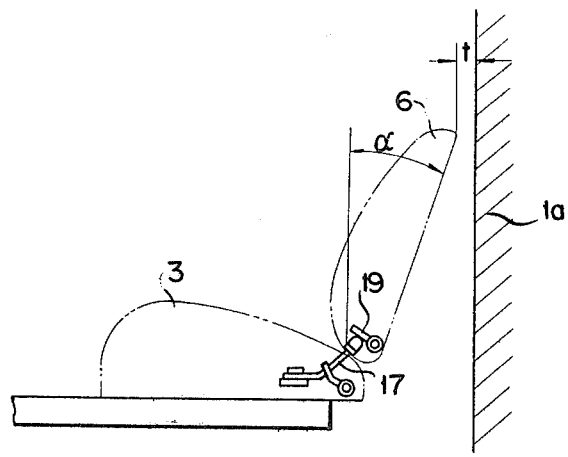
FIG. 3 is a schematic side view of a reclining seat of the present invention wherein the seat is pulled backward.

FIG. 3 is a schematic explanatory view showing the condition wherein the seat has been moved to its rearmost position. The maximum inclination angle α of the seat-back 6 is limited by means of the rod 17 and the stop 19 so that a clearance "t" can be kept between vehicle body's wall 1a such as cabin wall and the seat-back 6.

Figure 4:
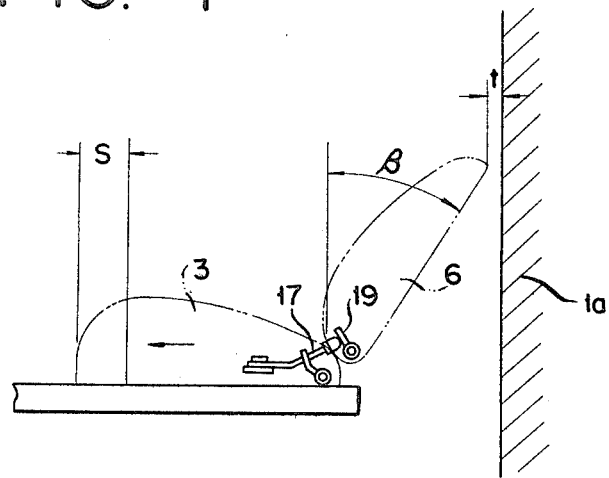
FIG. 4 is similar to FIG. 3 but showing the seat being pulled forwards.

When the seat is moved forwardly over a distance "S" as shown in FIG. 4 from the previous position, the oscillating link 9 is oscillated counterclockwise through the plate 11 and the link 13 by an amount corresponding to the amount of movement of the seat-cushion 3.

With the oscillatory movement of the oscillating link 9, the rod 17 can be moved more than the amount of movement of the guide 16 or the seat-cushion 3 by the ratio of the distance "L1" between the pin 10 and the pin 14 to the distance "L2" between the pin 10 and the ball joint 18. Consequently, the rod 17 is moved forwardly relative to the guide hole 15 of the guide 16 and so the upper end thereof having nuts 17a and 17b attached thereto is moved downwards as shown in FIG. 4.

As a result, the seat-back 6 is inclined until its stop 19 is allowed to abut against the nut 17a so that the maximum inclination angle of the seat-back 6 will become "β" which is larger than "α" shown in FIG. 3 with the same clearance "t" kept between the rear wall 1a of the driver's cab and the seat-back 6.

Because the rod 17 can be moved forwards and backwards correspondingly to the amount of longitudinal movement of the seat to enable the maximum inclination angle of the seat-back 6 to be automatically changed or controlled, the window glass etc. can be protected from a possible damage due to the seat back 6 striking against the rear wall 1a of the driver's cab.

Since the present invention is constructed as mentioned hereinabove, the maximum inclination angle of the seat-back can be automatically adjusted in accordance with the amount of longitudinal movement of the seat.

The relationship between the position of the seat and the rearward inclination angle of the seat-back according to an embodiment of the present invention is as follows.

| Position of Seat | Rearward Inclination Angle of Seat-back |
| --- | --- |
| Standard position | 10.5 degrees (3.5° × 3 steps) |
| 80 mm forwards | 24.5 degrees (3.5° × 7 steps) |
| 20 mm backwards | 7.0 degrees (3.5° × 2 steps) |

As can be seen from the foregoing, according to the present invention, it is possible to prevent a damage of the window glass etc. due to the seat-back 6 striking against the rear wall 1a of the driver's cab, and also the amount of reclining of the seat-back can be effectively utilized in a narrow vehicle's cabin thereby improving the degree of activity of the operator.

While this invention is susceptible of embodiment in various forms, there is shown in the drawings and has been described herein in detail a specific embodiment of the invention, with the understanding that the present disclosure is to be considered as an exemplification of the principle of the invention and is not intended to limit the invention to the embodiment illustrated.

What is claimed is:

1. In a reclining seat for a vehicle including a pair of rails fixedly secured to a vehicle frame, a seat-cushion slidably mounted on said rails, said seat-cushion having a frame mounted therein, a seat-back adapted to be inclined independently of and relative to said seat-cushion, said seat-back including a frame mounted therein, and connecting means for mechanically connecting said seat-cushion to said seat-back, the improvement comprising:

bracket means fixedly secured to said vehicle frame under said seat-cushion;

a first link pivotally mounted on said bracket means at one end thereof;

a second link fixedly secured to the frame of said seat-cushion at one end thereof and connected to said first link at the other end;

rod means pivotally mounted on the other end of said first link means at the lower end thereof, said rod means moving in response to the movement of said seat-cushion; and stop means fixedly secured to the frame of said seat-back, and movable in response to the inclination of said seat-back, the movement of said stop means being independent of the movement of said rod means, said stop means being adapted to contact the upper end of said rod means when said seat-back is rearwardly inclined to a maximum whereby the maximum inclination angle of said seat-back is automatically adjusted by changing the position of said seat-cushion.

2. A reclining seat as defined in claim 1 further comprising guide means for guiding said rod means, said guide means being fixedly secured to the frame of said seat-cushion at one end thereof.

3. A reclining seat as defined in claim 1 or 2 wherein said rod means has nut means threadably engaged with said rod means at the upper end thereof.

* * * * *